(12) United States Patent
Romanowski

(10) Patent No.: US 11,767,577 B2
(45) Date of Patent: Sep. 26, 2023

(54) COPPER ALLOY, USE OF A COPPER ALLOY, SANITARY FITTING AND METHOD FOR PRODUCING A SANITARY FITTING

(71) Applicant: LIXIL Corporation, Koto-ku (JP)

(72) Inventor: Carsten Romanowski, Iserlohn (DE)

(73) Assignee: LIXIL Corporation, Shinagawa-ku (JP)

( * ) Notice: Subject to any disclaimer, the term of this patent is extended or adjusted under 35 U.S.C. 154(b) by 0 days.

(21) Appl. No.: 16/638,039

(22) PCT Filed: Aug. 13, 2018

(86) PCT No.: PCT/EP2018/071949
§ 371 (c)(1),
(2) Date: Feb. 10, 2020

(87) PCT Pub. No.: WO2019/030416
PCT Pub. Date: Feb. 14, 2019

(65) Prior Publication Data
US 2020/0172995 A1 Jun. 4, 2020

(30) Foreign Application Priority Data
Aug. 11, 2017 (DE) ...................... 10 2017 118 386.8

(51) Int. Cl.
*C22C 9/04* (2006.01)
*B33Y 70/00* (2020.01)
(Continued)

(52) U.S. Cl.
CPC .................. *C22C 9/04* (2013.01); *B22F 1/05* (2022.01); *B33Y 70/00* (2014.12); *C22C 18/02* (2013.01);
(Continued)

(58) Field of Classification Search
None
See application file for complete search history.

(56) References Cited

U.S. PATENT DOCUMENTS 4,094,671 A * 6/1978 Hayashi .................... C22C 9/04
420/477
4,684,052 A * 8/1987 McDonald ........... B23K 35/302
228/122.1
(Continued)

FOREIGN PATENT DOCUMENTS

CN 1570164 A 1/2005
CN 102443716 A * 5/2012
(Continued)

OTHER PUBLICATIONS

International Search Report dated Jan. 21, 2019 in PCT/EP2018/071949 filed on Aug. 13, 2018, 4 pages.
(Continued)

*Primary Examiner* — Seth Dumbris
*Assistant Examiner* — Kim S. Horger
(74) *Attorney, Agent, or Firm* — Oblon, McClelland, Maier & Neustadt, L.L.P.

(57) ABSTRACT

Copper alloy, the elements of which have the following mass fractions:
  46% to 53.5% copper (Cu);
  0% to 1.0% aluminum (Al);
  0% to 1.40% lead (Pb);
  0% to 0.2% iron (Fe);
  0% to 0.4% tin (Sn);
  0% to 0.0002% boron (B);
  0% to 0.2% arsenic (As); and
  remainder zinc (Zn). In addition, a use of a corresponding copper alloy for an additive manufacturing process, a sanitary fitting (1) with a corresponding copper alloy,
(Continued)

Figure 1:
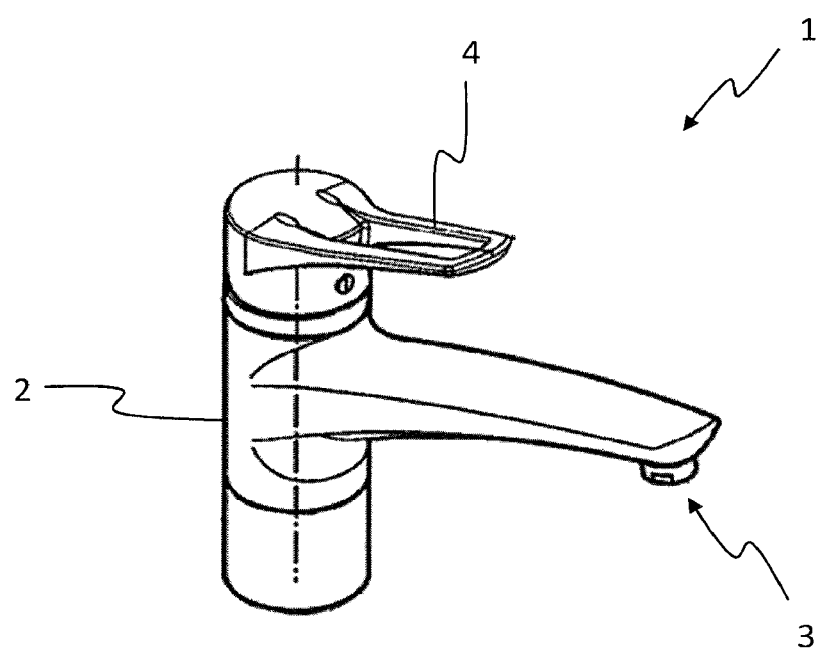

and a method for producing a sanitary fitting (1) from a corresponding copper alloy are proposed.

9 Claims, 2 Drawing Sheets

(51) Int. Cl.
*C22C 18/02* (2006.01)
*E03C 1/04* (2006.01)
*B22F 1/05* (2022.01)
B33Y 80/00 (2015.01)
B22F 10/28 (2021.01)

(52) U.S. Cl.
CPC ............... *E03C 1/04* (2013.01); *B22F 10/28* (2021.01); *B22F 2301/10* (2013.01); *B33Y 80/00* (2014.12)

(56) References Cited

U.S. PATENT DOCUMENTS

| | | | | |
|---|---|---|---|---|
| 2009/0263272 | A1* | 10/2009 | Uchida | B22C 9/22 |
| | | | | 420/478 |
| 2010/0098579 | A1* | 4/2010 | Xu | C22C 9/04 |
| | | | | 420/471 |
| 2013/0118309 | A1* | 5/2013 | Munce | C22C 18/02 |
| | | | | 75/646 |
| 2014/0346413 | A1 | 11/2014 | Inoue et al. | |
| 2015/0197831 | A1* | 7/2015 | Wu | C22C 1/02 |
| | | | | 420/473 |
| 2015/0249046 | A1 | 9/2015 | Sasaki et al. | |
| 2015/0368758 | A1* | 12/2015 | Li | C22C 9/04 |
| | | | | 420/471 |
| 2015/0376736 | A1 | 12/2015 | Schroeder et al. | |
| 2018/0148813 | A1* | 5/2018 | Yang | C22C 9/04 |

FOREIGN PATENT DOCUMENTS

| | | | | |
|---|---|---|---|---|
| CN | 103540792 | A * | 1/2014 | |
| CN | 105026586 | A | 11/2015 | |
| CN | 106884106 | A | 6/2017 | |
| JP | 10-183275 | A | 7/1998 | |
| KR | 10-2011-0025509 | A | 3/2011 | |
| WO | WO-2017071672 | A1 * | 5/2017 | ............... C22C 1/02 |

OTHER PUBLICATIONS

Combined Chinese Office Action and Search Report dated Jul. 12, 2021 in Chinese Patent Application No. 202010854792.4 (with English translation), 25 pages.
"The Chinese Science and Technology and Society Perspective by 2049: The Manufacturing Technology and Future Factory" Edited by the Chinese Mechanical Engineering Society, the Chinese Science and Technology Press, Jan. 31, 2016, p. 93.
Yuemin Jiang et al., "Furniture Design" Northeastern University Press, Jul. 31, 2017, p. 72.
"Hardware Commodity Knowledge" Edited by Sichuan Chongqing Hardware Branch, Chongqing Publishing Group, Aug. 31, 1982, pp. 46-48.

* cited by examiner

COPPER ALLOY, USE OF A COPPER ALLOY, SANITARY FITTING AND METHOD FOR PRODUCING A SANITARY FITTING

The present invention relates to a copper alloy, a use of a corresponding copper alloy for an additive manufacturing process, a sanitary fitting with a housing made of a corresponding copper alloy, and a method for producing a sanitary fitting. Sanitary fittings are used, in particular, for demand-based provision of a liquid, such as, e.g., water, at sinks, washbasins, showers, and/or bathtubs.

Sanitary fittings normally have a housing, through which the liquid can be conducted with pipes and/or passages to an outlet of the housing. In addition, actuators, such as, e.g., at least one lever and/or at least one (rotary) handle, are normally located on the housing, by means of which it is possible to control a temperature of the liquid and/or a flow rate of the liquid. To this end, at least one mixing valve and/or at least one thermostatic mixing valve, for example, may be arranged in the housing. The housing of the sanitary fitting can be made of plastic and/or metal. In the case of a housing made of metal, a copper alloys or a brass material is used, in particular, which means that the housing can be produced by a casting process. The design or layout of the housing must be suitable for the casting processes used, with the result that the degrees of freedom in the design or in the layout are limited.

It is now desired to increase the degree of freedom for such housings of sanitary fittings through the use of an additive manufacturing process. With an additive manufacturing process, the housing can be constructed layer by layer on a base, wherein a flowable starting material is deposited at a specified position and is then solidified. Mass production of corresponding housings through additive manufacturing processes, especially when economic considerations are also included, requires an adaptation of the material because the copper alloys and brass materials used for this purpose heretofore are not adequately suited to manufacturing processes of this type because of their high thermal conductivity and their high melting point.

The object of the invention is therefore to at least partially solve the problems described with respect to the prior art and, in particular, to specify a copper alloy with a lower thermal conductivity and a lower melting point. Furthermore, it is also an object to specify an advantageous potential application for a corresponding copper alloy. An additional object is to specify a sanitary fitting whose housing is made of a copper alloy with a lower thermal conductivity and a lower melting point. Yet another object is to specify a method for producing a sanitary fitting with a housing that is made of a copper alloy with a lower thermal conductivity and a lower melting point.

These objects are attained with a copper alloy, a use of a copper alloy, a sanitary fitting, and a method for producing a sanitary fitting according to the features of the independent claims. Additional advantageous embodiments of the invention are specified in the dependent claims. It should be noted that the features specified individually in the claims can be combined with one another in any technologically useful manner desired, and thus define additional embodiments of the invention. Moreover, the features specified in the claims are stated more precisely and explained in detail in the description, with additional preferred embodiments of the invention being described.

A contribution hereto is made by a copper alloy that has the following elements with the specified mass fractions:
- 46% to 53.5% copper (Cu);
- 0% to 1.0% aluminum (Al);
- 0% to 1.40% lead (Pb);
- 0% to 0.2% iron (Fe);
- 0% to 0.4% tin (Sn);
- 0% to 0.0002% boron (B);
- 0% to 0.2% arsenic (As); and
- the remainder zinc (Zn)
- any applicable contaminants.

The copper alloy may be selected so that, in addition to copper and zinc, there is at least one, two, three, four, five or six of the other aforesaid elements present with a proportion greater than 0%.

It is preferable that the majority of the other aforesaid elements are present in a proportion greater than 0%, in particular all with the exception of lead and/or arsenic.

It is possible that the elements present in addition to copper and zinc do not amount to more than 2.5%, preferably not more than 2.5% or even not more than 1.0% in total.

It is possible that after copper and zinc, the element aluminum is present with the largest mass fraction.

It is possible that after copper and zinc, the element lead is present with the largest mass fraction.

It is possible that iron and tin have approximately the same mass fraction.

It is possible that arsenic and lead have approximately the same mass fraction.

For example, this copper alloy may be selected to have at least one or preferably all of the following range specification(s) for the elements:
- 46% to 51% copper (Cu);
- 0.4% to 0.51% aluminum (Al);
- 0% to 0.85% lead (Pb);
- 0.05% to 0.08% iron (Fe);
- 0.1% to 0.18% tin (Sn);
- 0% to 0.0002% boron (B);
- 0% to 0.15% arsenic (As); and
- the remainder zinc (Zn).

If applicable, the copper alloy may include unavoidable residual amounts of other elements (e.g. contaminants), for example titanium (Ti), bismuth (Bi), and/or antimony (Sb), with these being limited in total to a maximum of 0.25% or limited individually to a maximum of 0.02%.

It is obvious that the copper alloy with the ranges given here should be selected in such a way that the sum of the alloying constituents is 100%.

This copper alloy is suitable for use in a casting process and/or an additive manufacturing process. Additive manufacturing processes include additive fabrication, additive manufacturing (AM) or 3D printing. In additive manufacturing processes, three-dimensional data models are used as the basis of fabrication from, in particular, amorphous material, such as, e.g., (metal) powder, by means of chemical and/or physical processes. The alloy is especially suitable for so-called selective laser melting (SLM) in a powder bed process, in which the processed material in powder form is applied in a thin layer to a base plate and locally melted by means of laser radiation. After solidification, the melted material forms a solid material layer. The base plate is then lowered by an amount equal to one layer thickness, and material in powder form is applied again. This cycle is repeated until all layers are fused. The completed part is cleaned of excess powder, and is mechanically processed further and/or finished.

Known copper alloys for sanitary fittings include, in particular, approximately 39% zinc, approximately 3% lead, and the remainder copper (all percentages in this document refer to percent by weight). In comparison to the known copper alloys, the proposed copper alloy has a lower copper content and a higher zinc content with adjusted mass fractions of aluminum and iron. As a result of the lower copper content, higher zinc content, and the sharp limitation or avoidance of grain refinement through boron, the melting point (casting temperature and welding temperature: approximately 895 to 930° C.) and the thermal conductivity of the copper alloy are reduced. As a result, a stable melt is made possible for additive manufacturing processes. The processing temperature in the vicinity of the boiling point of zinc is reduced (905° C.), sharply reducing the evaporation of zinc during processing of the copper alloy. As a result, the copper alloy is especially suitable for selective laser melting (SLM). The aluminum and iron components of the alloy serve, in particular, to stabilize the copper alloy. In a processing of the copper alloy by a casting process, moreover, the copper alloy solidifies with a coarse grain, has a higher strength than known copper alloys or brass, and/or is more stable with regard to stress-corrosion cracking. Moreover, the material costs can be lowered through a shifting of the copper content toward the zinc content.

The copper alloy can have (more than) 0.12% to (a maximum of) 0.85% lead (Pb). The copper alloy thus has a higher strength and an advantageous grain geometry. The higher strength and the advantageous grain geometry result, in particular, in good chip breaking during machining.

The copper alloy can have (more than) 0% to a maximum of 0.12% lead (Pb). A low-lead copper alloy of this nature has an even higher strength and an even more advantageous grain geometry. For example, when such a copper alloy is used, the strength can be further increased as compared to a copper alloy with up to 0.85% lead. The achievable grain geometry can bring about the result that the copper alloy lends itself well to grinding and polishing.

The copper alloy can have 0% lead (Pb), if applicable even with lead in the range of a contaminant with a maximum content of 0.02%. A lead-free copper alloy of this nature has an even further increased strength, which makes the copper alloy suitable, in particular, for thin-walled housings of a sanitary fitting. A thin-walled housing of a sanitary fitting has a wall thickness of, for example, less than 5.0 mm [millimeters], in particular less than 3.0 mm or even less than 2.0 mm, whereby the wall thickness should not go below 0.5 mm for reasons of stability. For example, the strength when a copper alloy with less than 0.22% or even in maximum 0.12% lead is used can be increased even further as compared to a copper alloy with 0% lead.

Furthermore, it is advantageous if the copper alloy has 0% arsenic (As), if applicable even with lead in the range of a contaminant with a maximum content of 0.02%.

Moreover, it is advantageous if the copper alloy has (more than) 0.02% to 0.2% or even only up to 0.15% arsenic (As). Adding arsenic (As) to the alloy largely reduces or prevents a dezincification of the copper alloy through corrosion. As a result, the copper alloy has a dezincification resistance or dezincification resistance properties ("DR properties"). Furthermore, arsenic (As) makes for a single-phase and coarse-grained structure.

The difference to conventional copper alloys, especially in the sanitary sector, can be demonstrated by the microstructure. In particular, the (cast) copper alloy and/or the sanitary fittings housing formed therefrom has an almost completely single-phased microstructure.

The copper alloy can be formed predominantly, almost completely or even with a pure BETA phase and can have a bcc lattice (bcc: "body-centered-cubic"; cubic room-centered). This microstructure can be characterized by a comparatively large grain size.

The following copper alloys have proven to be especially advantageous:

| Element | MS-AM Pb0 lead-free normal | MS-AM Pb012 low-lead normal | MS-AM Pb08 lead-reduced normal | MS-AM Pb0 lead-free DR | MS-AM Pb012 low-lead DR | MS-AM Pb08 lead-reduced DR |
|---|---|---|---|---|---|---|
| Cu | 46.00-51.00% | 46.00-51.00% | 46.00-51.00% | 46.00-51.00% | 46.00-51.00% | 46.00-51.00% |
| Al | 0.40-0.51% | 0.40-0.51% | 0.40-0.51% | 0.40-0.51% | 0.40-0.51% | 0.40-0.51% |
| Pb | 0% | 0-0.12% | 0.12-0.85% | 0% | 0-0.12% | 0.12-0.85% |
| Fe | 0.05-0.08% | 0.05-0.08% | 0.05-0.08% | 0.05-0.08% | 0.05-0.08% | 0.05-0.08% |
| Sn | 0.10-0.18% | 0.10-0.18% | 0.10-0.18% | 0.10-0.18% | 0.10-0.18% | 0.10-0.18% |
| B | 0-0.0002% | 0-0.0002% | 0-0.0002% | 0-0.0002% | 0-0.0002% | 0-0.0002% |
| As | 0% | 0% | 0% | 0.02-0.15% | 0.02-0.15% | 0.02-0.15% |
| Zn | remainder | remainder | remainder | remainder | remainder | remainder |

| Element | Test 3A | Test 3B | Test 3C | Test 3D | Test 3E | Test 3F |
|---|---|---|---|---|---|---|
| Cu | 48.0-53.5% | 48.0-53.5% | 48.0-53.5% | 48.0-53.5% | 48.0-53.5% | 48.0-53.5% |
| Al | 0.1-0.4% | 0.7-0.9% | 0.1-0.4% | 0.7-0.9% | 0.1-0.4% | 0.7-0.9% |
| Pb | 0.8-1.3% | 0.8-1.3% | 0.8-1.3% | 0.8-1.3% | 0.8-1.3% | 0.8-1.3% |
| Fe | 0.1-0.2% | 0.1-0.2% | 0.1-0.2% | 0.1-0.2% | 0.1-0.2% | 0.1-0.2% |
| Sn | 0.1-0.3% | 0.1-0.3% | 0.1-0.3% | 0.1-0.3% | 0.1-0.3% | 0.1-0.3% |
| B | 0-0.0002% | 0-0.0002% | 0-0.0002% | 0-0.0002% | 0-0.0002% | 0-0.0002% |
| As | 0% | 0% | 0% | 0% | 0% | 0% |
| Zn | remainder | remainder | remainder | remainder | remainder | remainder |

The following copper alloys were evaluated concretely in terms of the following properties:

| Element | MS-AM Pb0 lead-free normal | MS-AM Pb012 low-lead normal | MS-AM Pb08 lead-reduced normal | MS-AM Pb0 lead-free DR | MS-AM Pb012 low-lead DR | MS-AM Pb08 lead-reduced DR |
|---|---|---|---|---|---|---|
| Cu | 50.00% | 50.00% | 49.37% | 50.00% | 50.00% | 49.37% |
| Al | 0.48% | 0.48% | 0.48% | 0.48% | 0.48% | 0.48% |
| Pb | 0% | 0.12% | 0.75% | 0% | 0.12% | 0.75% |
| Fe | 0.07% | 0.07% | 0.07% | 0.07% | 0.07% | 0.07% |
| Sn | 0.16% | 0.16% | 0.16% | 0.16% | 0.16% | 0.16% |
| B | 0.0002% | 0.0002% | 0.0002% | 0.0002% | 0.0002% | 0.0002% |
| As | 0% | 0% | 0% | 0.10% | 0.10% | 0.10% |
| Zn | 49.29% | 49.17% | 49.17% | 49.19% | 49.07% | 49.07% |

| Element | Test 3A | Test 3B | Test 3C | Test 3D | Test 3E | Test 3F |
|---|---|---|---|---|---|---|
| Cu | 51% | 51% | 52% | 52% | 53% | 53% |
| Al | 0.3% | 0.8% | 0.3% | 0.8% | 0.3% | 0.8% |
| Pb | 0.85% | 0.85% | 0.85% | 0.85% | 0.85% | 0.85% |
| Fe | 0.15% | 0.15% | 0.15% | 0.15% | 0.15% | 0.15% |
| Sn | 0.2% | 0.2% | 0.1% | 0.1% | 0.3% | 0.3% |
| B | 0.0002% | 0.0002% | 0.0002% | 0.0002% | 0.0002% | 0.0002% |
| As | 0% | 0% | 0% | 0% | 0% | 0% |
| Zn | 47.5% | 447% | 446.6% | 446.1% | 445.4% | 444.9% |

At least some of the following properties were evaluated: suitability for casting, suitability for SLM, thermal conductivity, zinc evaporation, strength, corrosion resistance, stress-corrosion cracking, chip-breaking characteristics, suitability for grinding, suitability for thin-walled housings, resistance to stress cracking, dezincification resistance, hardness.

Cylindrical specimens with a diameter of 60 mm were cast to determine hardness. On these the hardness was determined according to Vickers with a pyramid body and a load of 40 kgf.

The following (surprising) properties of the proposed copper alloy shall be particularly emphasized, which can be achieved with an appropriate choice of alloying elements:

The manufacturing process of products can be carried out with considerably less energy because a lower melting temperature can be set compared to alloys with a higher copper content. Thus, for example, the melting temperature can be reduced from above 930° C. to 1,040° C. to a range below 930° C., or even to about 900° C.

Despite the low lead content, (cutting) finishing can be carried out in such a way that undesirable spiral chips are avoided. Additional water cooling may be advantageous for this purpose.

The corrosion resistance of the proposed copper alloy can at least be maintained compared to alloys with a higher copper content, even under tension. Also with regard to dezincification resistance, no decrease is to be accepted.

Contrary to all expectations, the castability of the proposed copper alloy can be improved compared to alloys with a higher percentage of copper.

Compared to alloys with a higher proportion of copper, larger grains can be set in the microstructure, whereby a single-phase structure is present. This allows the hardness and/or tensile strength (Rm) to be improved.

For example, an increase in tensile strength (Rm) of 15-20 percent can be achieved.

It is also possible to achieve a higher hardness compared to alloys with a higher proportion of copper, with an increase of up to 30 percent. It is therefore possible to achieve a hardness of at least 100 HV or even at least 110 HV or approx. 120 HV with the copper alloy proposed here.

It is especially advantageous if the copper alloy is in powder form and has a particle size from 5 µm (micrometers) to 1,500 µm. The particles have, in particular, a spherical and/or polyhedral shape in this case. The particle size relates, in particular, to an average diameter of a particle of the copper alloy. Particle sizes from 5 µm to 30 µm are especially suitable for fill structures, highest-density end structures, coloring additives, microstructures, micro-alloying during printing, to produce conductivity, catalytic substances, two-component systems, corrosion inhibitors, antibacterial materials, acoustic insulation materials and/or thermal insulators. Particle sizes from 30 µm to 70 µm are especially suitable for shaped structures, medium-density end structures, support structures, two-component systems, acoustic insulation materials and/or thermal insulators. Particle sizes from 70 µm to 1,500 µm are especially suitable for macrostructures, porous to medium-density end structures, screen structures, filter structures, open structures, coarse fill structures, support structures, two-component systems, three-component systems, acoustic insulation materials and/or thermal insulators.

Pursuant to another aspect of the invention, the use of a copper alloy specified here is proposed for an additive manufacturing process, in particular the SLM process.

Pursuant to another aspect of the invention, a sanitary fitting with a housing is proposed, wherein the housing is made at least partly of a copper alloy specified here.

Pursuant to another aspect of the invention, a method for producing a sanitary fitting is specified, wherein a housing of the sanitary fitting is manufactured at least partly of a copper alloy specified here. Manufacture of the housing is accomplished by a casting process or an additive manufacturing process.

In particular, the use of a copper alloy specified here, in particular with a pure monophase (BETA phase), is proposed for the manufacture of a (in particular thin-walled) sanitary fitting or parts thereof by means of a casting process or by a generative manufacturing process.

The invention and the technical background are explained below with reference to the figures. It should be noted that the figures show especially preferred variant embodiments of the invention, but the invention is not limited thereto.

FIG. 1 shows a sanitary fitting 1 with a housing 2, through which water can be conducted to an outlet 3. The temperature of the water and a discharge volume of the water can be controlled by means of a lever 4 located on the housing 2. The housing 2 is made at least partly of the copper alloy as proposed.

Figure 2A:
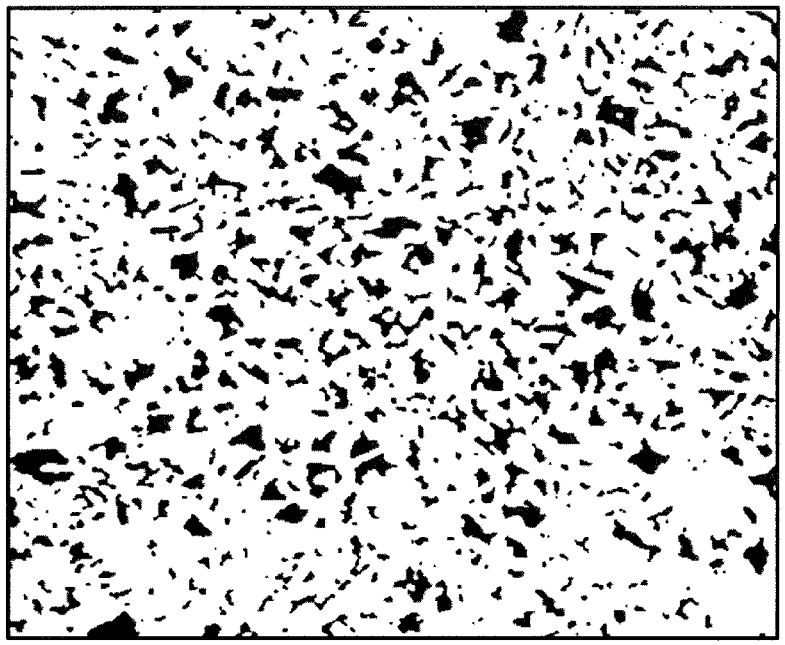
Figure 2B:
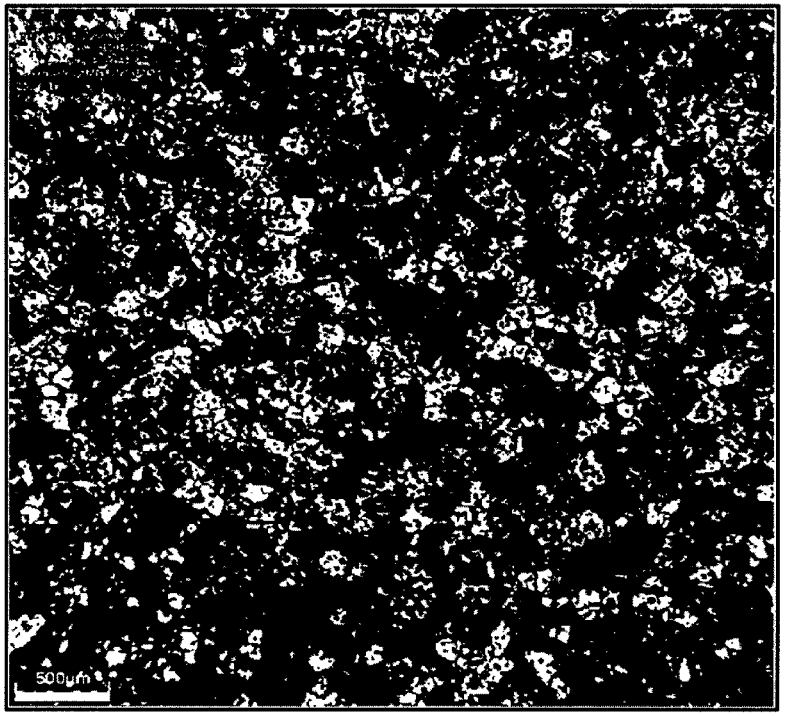

In FIG. 2, the different microstructures of a known copper alloy (FIG. 2A) and the copper alloys proposed here (FIG. 2B) are illustrated by way of example. FIG. 2A shows that approx. 60 percent is ALPHA phase (light areas) and approx. 40 percent is BETA phase (dark areas). Significantly different from this is the copper alloy proposed here, namely with a predominantly or even almost complete single-phase BETA phase (cf. dark areas FIG. 2B).

The following copper alloy (M60) in particular can be used as a comparative example, the structure of which is also illustrated in FIG. 2A:

| element | Cu [%] | Al [%] | Pb [%] | Fe [%] | Sn [%] | B [%] | As [%] | Ni [%] | Zn [%] |
|---|---|---|---|---|---|---|---|---|---|
| M60 | 59-61 | 0.4-0.7 | 1.2-2.2 | ≤0.2 | ≤0.2 | ≤0.2 | ≤0.02 | ≤0.2 | remainder |

In addition, the copper alloy M60 may contain unavoidable residues of other elements (e.g. contaminants), such as phosphorus (P), manganese (MN), bismuth (Bi), chromium (Cr), sulphur (S), magnesium (Mg) and/or antimony (Sb), individually limited to a maximum of 0.02%.

The here newly proposed copper alloy has a low thermal conductivity and a lower melting point, and is advantageously suitable for casting processes and additive manufacturing processes for the manufacture of sanitary fittings.

LIST OF REFERENCE CHARACTERS 1 sanitary fitting
2 housing
3 outlet
4 lever

The invention claimed is:
1. A copper alloy, consisting of, in mass fractions:
46% to 53.5% copper (Cu);
0% to 1.0% aluminum (Al);
0% to 1.40% lead (Pb);
0% to 0.2% iron (Fe);
0% to 0.4% tin (Sn);
more than 0% to 0.0002% boron (B);
0% to 0.2% arsenic (As);
Zinc; and
at least one contaminant included in an unavoidable residual amount, limited individually to a maximum of 0.02%,
wherein the at least one containment is one or more elements other than Cu, Al, Pb, Fe, Sn, B, As and Zinc, and
wherein the copper alloy is formed predominantly with BETA phase.

2. The copper alloy according to claim 1, wherein the contaminant is at least one element selected from the group consisting of phosphorus (P), manganese (Mn), bismuth (Bi), chromium (Cr), sulphur (S), magnesium (Mg) and antimony (Sb).

3. A copper alloy, consisting of, in mass fractions:
46% to 53.5% copper (Cu);
0% to 1.0% aluminum (Al);
0% to 1.40% lead (Pb);
0% to 0.2% iron (Fe);
0% to 0.4% tin (Sn);
more than 0% to 0.0002% boron (B);
0% to 0.2% arsenic (As);
Zinc; and
one or more contaminants included in an unavoidable residual amount, selected from the group consisting of manganese (Mn), bismuth (Bi), chromium (Cr), sulphur (S), magnesium (Mg) and antimony (Sb),
wherein the copper alloy is formed predominantly with BETA phase.

4. A sanitary fitting, comprising:
a housing that comprises the copper alloy according to claim 1.

5. A sanitary fitting, comprising:
a housing that comprises the copper alloy according to claim 3.

6. A method for producing a sanitary fitting, comprising:
manufacturing a housing by at least one of a casting process and an additive manufacturing process,
wherein the housing comprises the copper alloy according to claim 1.

7. The method according to claim 6, wherein the copper alloy comprises a melting temperature of below 930° C.

8. A method for producing a sanitary fitting, comprising:
manufacturing a housing by at least one of a casting process and an additive manufacturing process, wherein the housing comprises the copper alloy according to claim 3.

9. The method according to claim 8, wherein the copper alloy comprises a melting temperature of below 930° C.

* * * * *